(12) United States Patent
Garg et al.

(10) Patent No.: US 6,535,073 B1
(45) Date of Patent: Mar. 18, 2003

(54) DEVICE AND METHOD FOR I/Q MODULATION, FREQUENCY TRANSLATION AND UPSAMPLING

(75) Inventors: Atul Garg, San Jose, CA (US); Colin D. Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/633,963

(22) Filed: Aug. 8, 2000

(51) Int. Cl.$^7$ ................................................ H04L 27/20

(52) U.S. Cl. .................. 332/103; 375/295; 375/298

(58) Field of Search .................. 375/295, 298; 332/103; 708/313

(56) References Cited

U.S. PATENT DOCUMENTS 5,621,762 A * 4/1997 Miller et al. ................. 332/103
5,978,420 A * 11/1999 Koslov et al. ............... 375/295

* cited by examiner

*Primary Examiner*—Arnold Kinkead
(74) *Attorney, Agent, or Firm*—Renner, Otto, Boisselle & Sklar, LLP

(57) ABSTRACT

A device for modulating a carrier signal comprises a mapper generating a baud rate data signal at a first data value frequency. A complex mixer and an upsampling device are used to increase the data value frequency and spectrum shift the data signal. A finite impulse response filter operating on the data signal to generate filtered first signal with characteristics that provide for reduced side band noise when the filtered signal is mixed to generate a quadrature amplitude modulated carrier.

12 Claims, 4 Drawing Sheets

DEVICE AND METHOD FOR I/Q MODULATION, FREQUENCY TRANSLATION AND UPSAMPLING

TECHNICAL FIELD

The present invention relates generally to network interfacing, and more particularly, to a device and method for I/Q modulation, frequency translation and upsampling.

BACKGROUND OF THE INVENTION

The transmission of various types of digital data between computers continues to grow in importance. The predominant method of transmitting such digital data includes coding the digital data into a low frequency base data signal and modulating the base data signal onto a high frequency carrier signal. The high frequency carrier signal is then transmitted across a network cable medium, via RF signal, modulated illumination, or other network medium, to a remote network node.

At the remote computing station, the high frequency carrier signal must be received and demodulated to recover the original base data signal. In the absence of any distortion of the carrier signal across the network medium, the received carrier would be identical in phase, amplitude, and frequency to the transmitted carrier and could be demodulated using known mixing techniques to recover the base data signal. The base data signal could then be recovered into digital data using known sampling algorithms.

One problem with such networks is that the network topology tends to distort the high frequency carrier signal due to numerous branch connections and different lengths of such branches causing numerous reflections of the transmitted carrier. The high frequency carrier is further distorted by spurious noise caused by electrical devices operating in close proximity to the cable medium. Such problems are even more apparent in a network which uses home telephone wiring cables as the network cable medium because the numerous branches and connections are typically designed for transmission of plain old telephone system (POTS) signals in the 3–10 kilohertz frequency and are not designed for transmission of high frequency carrier signals on the order of 7 Megahertz. Further yet, the high frequency carrier signal is further distorted by turn-on transients due to on-hook and off-hook noise pulses of the POTS utilizing the network cables.

Such distortion of frequency, amplitude, and phase of the high frequency carrier signal degrades network performance and tends to impede the design of higher data rate networks. Known techniques for compensating for such distortion and improving the data rate of a network include complex modulation schemes.

Utilizing a complex modulation scheme such as quadrature amplitude modulation (QAM) data, both the amplitude and phase of the high frequency carrier are modulated to represent I and Q components of a base data signal. Referring to FIG. 1, a 4-QAM modulation constellation 10 is shown. In operation, each data symbol is represented by an I-value of +1 or −1 and a Q-value of +1 or −1 such that the data symbol can be represented by one of the four modulation states 12(a)–(d) in constellation 10. Each constellation state 12(a)–12(d) represents a unique combination of carrier amplitude and phase. For example, constellation state 12(a) represents a carrier amplitude of 14 and a carrier phase 16.

A complex modulation transmitter typically uses a look up table to generate an I-channel and a Q-channel baud rate data signal. An upsampler then inserts additional sample values of zero to increase the input sample frequency to the desired carrier frequency. A complex mixer then mixes each of the I-channel signal and the Q-channel signal by digital sine waves and digital cosine waves of the carrier frequency as appropriate to generate a modulated carrier signal. Narrow band digital filters are then used to remove harmonics and to assure that the transmitted signal has a strong signal to noise ratio within the desired band without excessive noise in the side bands.

A problem with such systems is that a carrier frequency on the order of 7 MHz is typically represented by digital values clocked at a frequency on the order of 32 MHz. As such, a digital signal processor (DSP) implementation of a QAM (or I/Q) transmitter can consume many gates or may not even be possible to implement in a high speed DSP without architectural innovation. What is needed is a device and method for I/Q modulation, upsampling, and digital filtering that does not suffer the disadvantages of known systems.

SUMMARY OF THE INVENTION

A first object of the present invention is to provide a device for modulating a carrier signal comprising: (a) a mapper generating a first data signal at a first data value frequency; (b) an upsampling device to increase the data value frequency of the first channel data signal to a second data value frequency; and (c) a pulse shaper including a finite impulse response filter operating on the first channel data signal to generate a filtered first channel data signal with characteristics that provide for reduced side band noise when mixed with a carrier frequency sine wave form signal. The device may further include a pre-scaler, positioned between the mapper and the upsampling device, operating to multiply the first data signal by a value corresponding to a selected baud rate to control signal strength of a carrier.

The mapper may further generate a second channel data signal at the first data value frequency and the device may further include: (a) a second upsampling device to increase the data value frequency of the second channel data signal to a second data value frequency; (b) a second pulse shaper including a finite impulse response filter operating on the second channel data signal to generate a filtered second channel data signal with characteristics that provide for reduced side band noise when mixed with a carrier frequency cosine wave form signal; and (c) a second pre-scaler, positioned between the mapper and the second upsampling device, operating to multiply the second data signal by a value corresponding to a selected baud rate. An adder may be included for adding the result of the first pulse shaper and the second pulse shaper to generate a complex modulated carrier signal.

The first channel data signal and the second channel data signal may be an I-channel data signal and a Q-channel data signal respectively and the output of the adder may be a quadrature amplitude modulated carrier signal.

A second objective of the present invention is to provide a method of modulating a carrier signal, the method comprising: (a) generating a first channel data signal at a first data value frequency; (b) increasing the data value frequency of the first channel data signal to a second data value frequency; and (c) filtering the first channel data signal to generate a filtered first channel data signal with characteristics that provide for reduced side band noise when mixed with a carrier frequency sine wave form signal. The method may further include: (d) scaling the first channel data signal with a value selected to correspond with a selected baud rate to control signal strength of a carrier; (e) generating a second channel data signal at the first data value frequency; (f) increasing the data value frequency of the second channel data signal to the second data value frequency; (g) filtering the second channel data signal to generate a filtered second channel data signal with characteristics that provide for reduced side band noise when mixed with a carrier frequency cosine wave form signal; and (h) scaling the second channel data signal with a value selected to correspond with a selected baud rate to control signal strength of a carrier.

The method may further yet include adding the filtered first channel data signal with the filtered second channel data signal to generate a complex modulated carrier signal.

The first channel data signal and the second channel data signal may be an I-channel data signal and Q-channel data signal respectively and the complex modulated carrier signal may be a quadrature amplitude modulated carrier signal.

A third object of the present invention is to provide a device for modulating a carrier signal comprising: (a) a mapper generating a first channel data signal and a second channel data signal, both at a first data value frequency; (b) a complex mixer including:

(i) a first multiplier and a second multiplier each multiplying the first channel data signal by a sine wave form and a cosine wave form respectively;

(ii) a third and fourth multiplier each multiplying the second channel data signal by the sine waveform and a cosine wave form respectively;

(iii) a first channel summer adding the result of the second multiplier to the result of the third multiplier multiplied by negative one; and (iv) a second channel summer adding the result of the first multiplier and the result of the fourth multiplier, the base rate sine waveform and the base rate cosine waveform having a frequency of one fourth the first sampling frequency;

(c) an upsampling device to increase the data value frequency of the result of the first channel summer and the result of the second channel summer; and (d) a finite impulse response filter operating on the first channel data signal and the second channel data signal respectively to generate a filtered first channel data signal and a filtered second channel data signal, both with characteristics that provide for reduced side band noise when the filtered second channel data signal is subtracted from the filtered first channel data signal.

The device may further include a third summer for subtracting the filtered second channel data signal from the filtered first channel data signal to generate a complex modulated carrier signal.

The result of the first channel summer may be an I-channel signal, the result of the second channel summer may be a Q-channel signal, and the output of the third summer may be a quadrature amplitude modulated carrier signal.

A fourth object of the present invention is to provide a method of modulating a carrier signal, the method comprising: (a) generating a first channel data signal and a second channel data signal, both at a first data value frequency; (b) performing complex mixing to generate:

(i) a first channel complex mixed signal resulting from subtracting the result of mixing the second channel data signal with a sine waveform from the result of mixing the first channel data signal with a cosine waveform; and (ii) a second channel complex mixed signal resulting from adding the result of mixing the second channel data signal with a cosine waveform and the result of mixing the first channel data signal with a sine waveform, the sine waveform and the cosine waveform having a frequency of one fourth the first data value frequency;

(c) upsampling each of the first channel complex mixed signal and the second channel complex mixed signal to increase the data value frequency of; and (d) filtering each of the first channel complex mixed signal and the second channel complex mixed signal to generate each of a first channel filtered complex mixed signal and a second channel filtered complex mixed signal respectively, both with characteristics that provide for reduced side band noise when the second channel filtered complex mixed signal is subtracted from the first channel filtered complex mixed signal.

The method may further include subtracting the second channel filtered complex mixed signal from the first channel filtered complex mixed signal to generate a complex modulated carrier signal.

The first channel data signal and the second channel data signal may be an I-channel data signal and a Q-channel data signal respectively and the complex modulated carrier signal may be a quadrature amplitude modulated carrier signal.

DESCRIPTION OF THE PREFERRED EMBODIMENTS

Figure 1:
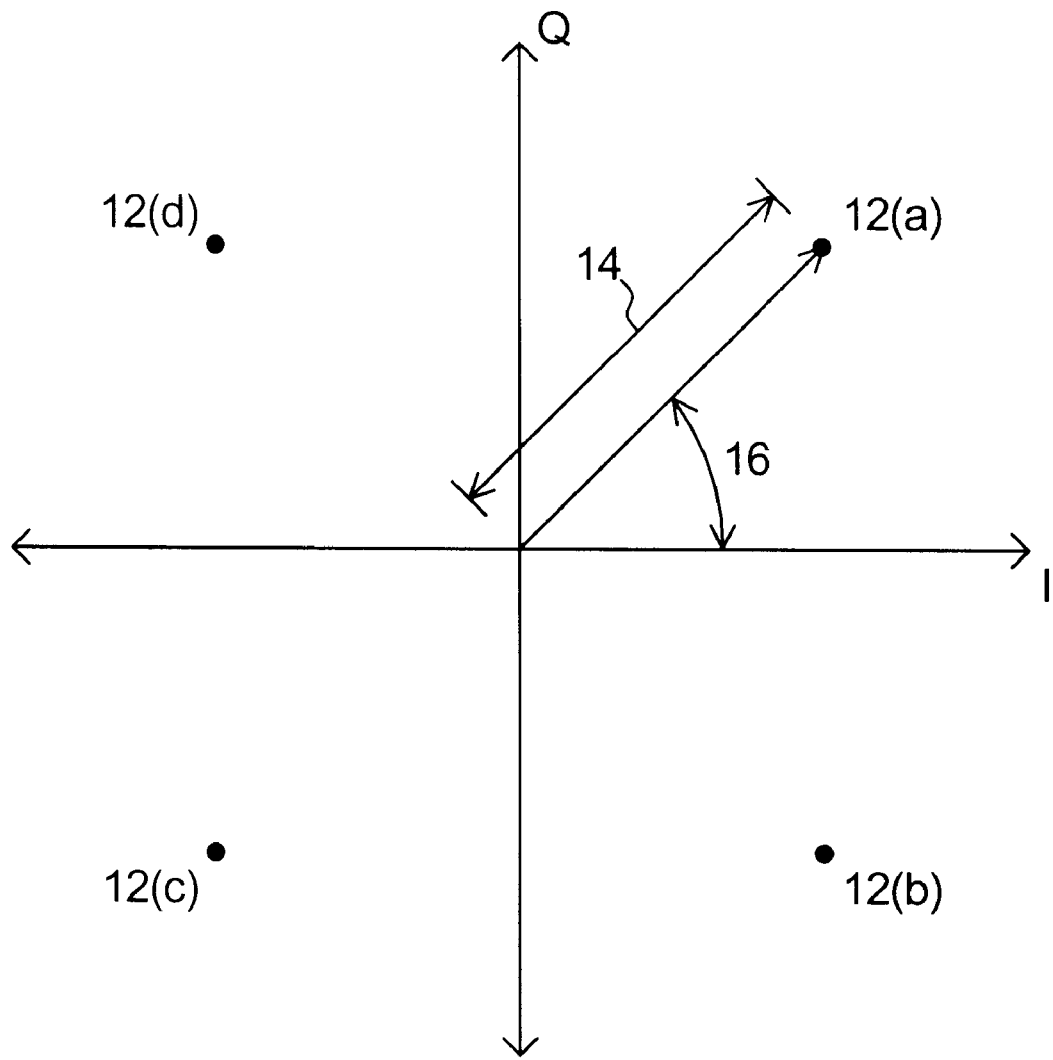
FIG. 1 is a diagram of a complex modulation constellation useful in the practice of present invention.

The present invention will now be described in detail with reference to the drawings. In the drawings, like reference numerals are used to refer to like elements throughout.

Figure 2:
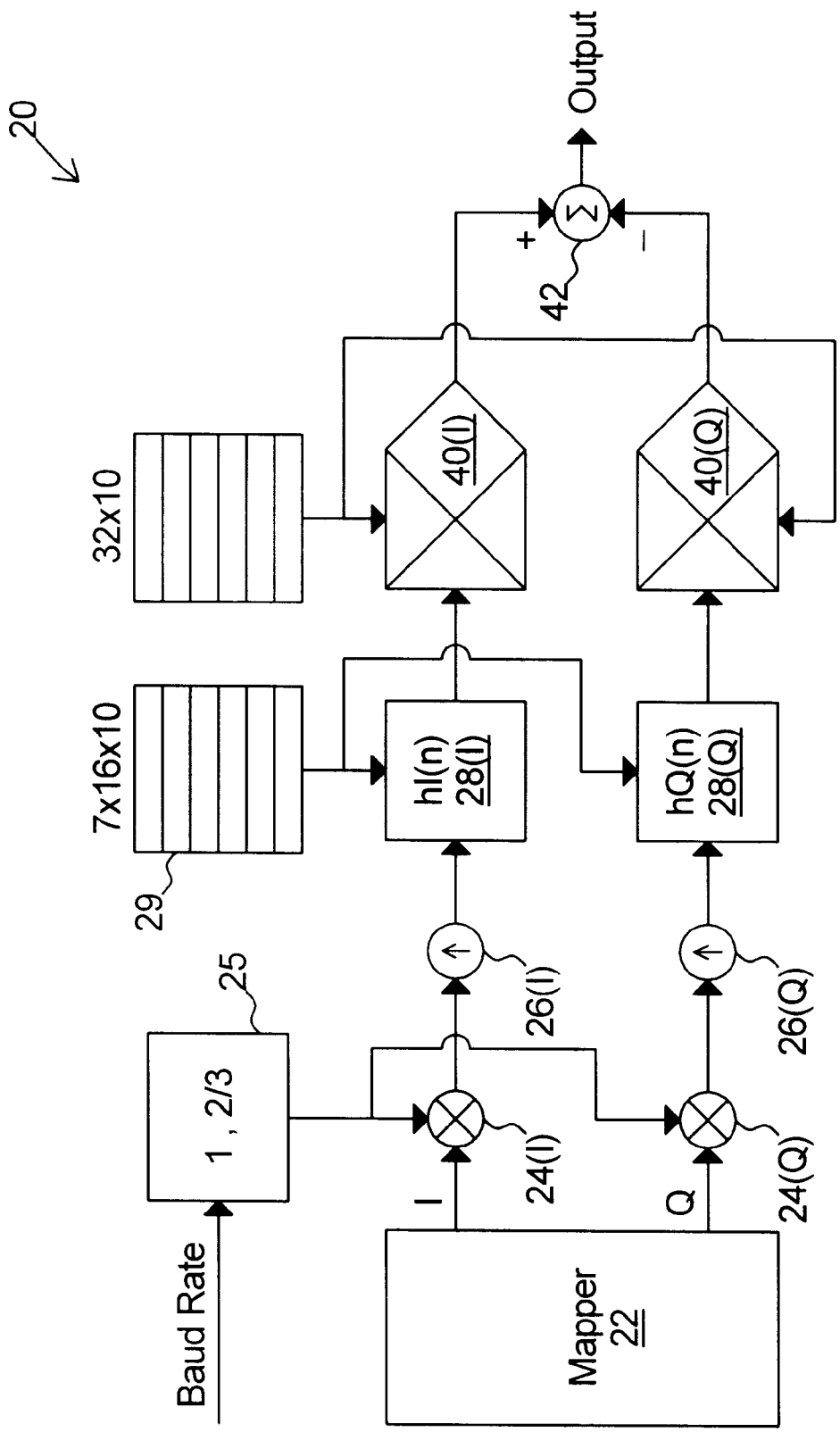
FIG. 2 is a block diagram of a first embodiment of a device in accordance with this invention.

Referring to FIG. 2, a first embodiment of a transmitter circuit 20 for I/Q modulation, frequency translation, and filtering is shown. Transmitter circuit 20 includes mapper 22 which will typically include a look up table for generating each of an I-channel and a Q-channel baud rate data signals using techniques known in the art. In the preferred embodiment, each data signal is 7 bits wide and the data is either at a 2 MHz or 4 MHz baud rate. However, both the 2 Mbaud and the 4 Mbaud data are represented by a data signal comprising a series of data values clocked at 4 MHz, every other data value being a zero for the 2 Mbaud data. The I-channel data signal and the Q-channel data signal are each input to a pre-scaler 24(I), 24(Q) respectively. Each of the pre-scaler's 24(I) and 24(Q) multiply the I-channel data signal or Q-channel data signal by a scaler value from multiplexer 25. Multiplexer 25 selects between scaler values of 1 and ⅔ based on an input baud rate signal. When the baud rate is 2 MHz the selected scaler value is 1 and when the baud rate is 4 MHz, the selected scaler value is ⅔. The purpose of scaling the I-channel data signal and the Q-channel data signal is to assure that the total signal strength remains within the required range independent of the baud rate.

The outputs of the pre-scalers 24(I) and 24(Q) are input to each of an I-channel upsampler 26(I) and a Q-channel upsampler 26(Q) respectively which function to increase the sampling rate from 4 MHz to 32 MHz by inserting sample values of zero at a 32 MHz rate between the 4 MHz sample values.

The 32 MHz samples of each of the I-channel signal and the Q-channel signal are input to each of an I-channel pulse shaper 28(I) and a Q-channel pulse shaper 28(Q) respectively (collectively referred to as pulse shapers 28). Pulse shapers 28 are 16 TAP finite impulse response (FIR) digital filters.

Figure 3:
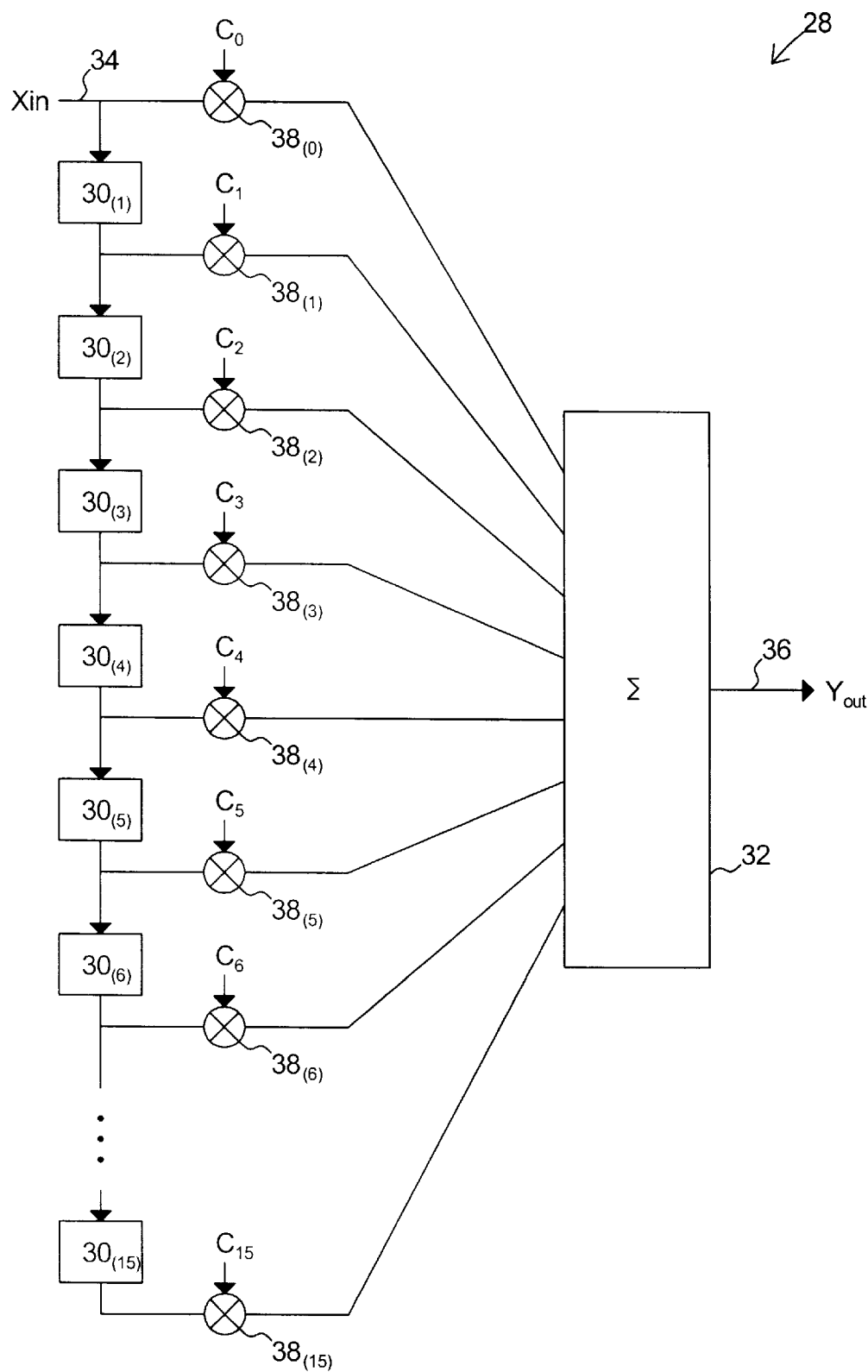
FIG. 3 is a block diagram of a digital filter useful in implementing an embodiment of this invention.

Referring briefly to FIG. 3, a 16 TAP FIR filter 28 is shown in more detail. Input port 34 of filter 28 receives each sequential sample value. In a first clock cycle, a first sample value is input to each of multiplier 38(0), operating to multiply the first sample value by a coefficient C(0), and a delay register 30(1) which operates to store the first sample value for one clock cycle. At a second clock 25 cycle, immediately following the first clock cycle, the first sample value is released from delay register 30(1) and input to multiplier 38(1) where it is multiplied by a second coefficient C(1). Simultaneously, the first sample value is also input to a second delay register 30(2) wherein it will be stored before being input to a third multiplier 38(2) in a third clock cycle and to subsequent delay registers 30(3) to 30(15) and subsequent multipliers 38(3) to 38(15) in subsequent clock cycles in a similar manner.

Simultaneously at the second clock cycle, a second sample value at input port 34 is input to the first delay register 30(1). At each clock cycle, the results from each multiplier 38(0) to 38(15) are input to summer 32 which adds such results and generates output signal 36 which is a series of filtered sample values occurring at the 32 MHz sampling frequency.

It should be appreciated that 16 TAP FIR filter includes 16 multipliers. However, referring again to FIG. 2, it should be appreciated that a characteristic of both the 32 MHz I-channel signal and the 32 MHz Q-channel signal from the upsamplers 26(I) and 26(Q) is that each data value from the 4 MHz signal is followed by seven values of zero. As such, there is a maximum of only two non-zero samples that can reside in a 16-TAP filter at any particular time and therefore the pulse shaper 28 can be implemented with only two multipliers rather than the typical 16 multipliers.

Referring again to FIG. 2, the coefficients for pulse shaper 28 are stored in a coefficient matrix 29. Coefficient matrix 29 is a 7×16×10 matrix which stores 7 sets of coefficients. Each set contains 16 coefficients and each coefficient is 10 bits wide. Each one of the seven sets of coefficients uniquely corresponds to one of the seven possible "bits per baud" rates as set forth in the following table:

| Bits per Baud | Baud Rate (Mbps) |
| --- | --- |
| 2 | 2/4 |
| 3 | 2/4 |
| 4 | 2/4 |
| 5 | 2/4 |
| 6 | 2/4 |
| 7 | 2/4 |
| 8 | 2/4 |

The output of pulse shaper 28(I) is an I-channel base band pulse signal and the output of pulse shaper 28(Q) is a Q-channel base band pulse signal, both with characteristics such that side band noise is reduced when QAM modulated onto a carrier.

The output from I-channel pulse shaper 28(I) and from the Q-channel pulse shaper 28(Q) are input to a sine mixer 40(I) and cosine mixer 40(Q) respectively.

Sine mixer 40(I) operates to mix a carrier frequency sine waveform, represented by a 32 MHz sequence of sample values, with the I-channel base band signal. Cosine mixer 40(Q) operates to mix a carrier frequency cosine waveform, represented by a 32 MHz sequence of sample values, with the Q-channel base band signal. A summer 42 operates to subtract the result of mixer 40(Q) from the result of mixer 40(I) resulting in a sequence of sample values representing the quadrature amplitude modulated carrier signal. Such sequence of samples is then converted to an analog carrier signal and transmitted over a transmission medium using digital to analog techniques known to those skilled in the art.

Figure 4:
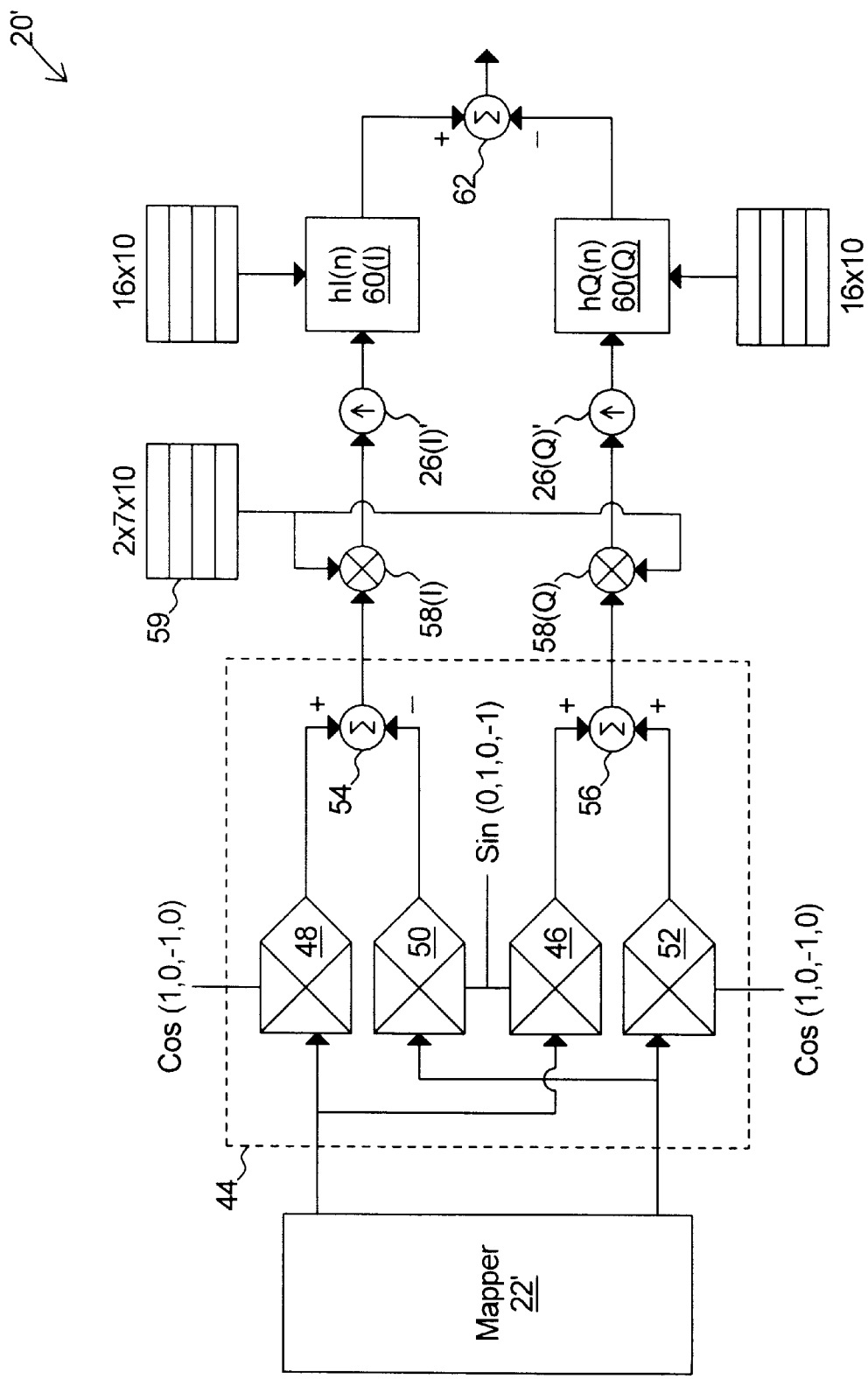
FIG. 4 is a block diagram of a second embodiment of a device in accordance with this invention.

Referring to FIG. 4, a second embodiment of a device transmitter circuit 20' for I/Q modulation, frequency translation, and filtering is shown. Transmitter circuit 20' includes mapper 22' which will typically include a look up table for generating each of an I-channel and a Q-channel baud rate data signals using techniques known in the art. In the preferred embodiment, each data signal is 7 bits wide and the data is either at a 2 MHz or 4 MHz baud rate. However, both the 2 Mbaud and the 4 Mbaud data are represented by a data signal comprising a series of data values clocked at 4 MHz, every other data value being a zero for the 2 Mbaud data.

Each of the I-channel and Q-channel data signals are input to a complex mixer 44. Complex mixer 44 includes a first multiplier 46 and a second multiplier 48 each multiplying the I-channel data signal by a 1 MHz sine wave form and a 1 MHz cosine wave form respectively. A third multiplier 50 and a fourth multiplier 52 each multiply the Q-channel data signal by the 1 MHz sine waveform and a 1 MHz cosine wave form respectively. An I-channel summer 54 subtracts the result of the third multiplier 50 from the result of the second multiplier 48 and a Q-channel summer 56 adds the result of first multiplier 46 and the result of the fourth multiplier 52. The 1 MHz sine waveform and the 1 MHz cosine waveform each have a frequency of one fourth the frequency of the data samples such that multiplication is simplified.

The I-channel output and the Q-channel output of the complex mixer 44 are input to each of an I-channel pre-scaler 58(I) and a Q-channel pre-scaler 58(Q) (collectively referred to as pre-scalers 58). Each of pre-scalers 58 function to multiply each data value by one of 14 coefficients selected from a 14×10 coefficient matrix 59. Each of the 14 10-bit coefficients stored in coefficient matrix 59 corresponds to one of the 14 combinations of baud rate and bits per baud as set forth in the following table:

| Baud Rate | Bits per Baud (Mbps) |
| --- | --- |
| 2 | 2 |
| 2 | 3 |
| 2 | 4 |
| 2 | 5 |
| 2 | 6 |
| 2 | 7 |
| 2 | 8 |
| 4 | 2 |
| 4 | 3 |
| 4 | 4 |
| 4 | 5 |
| 4 | 6 |
| 4 | 7 |
| 4 | 8 |

The I-channel data signal from pre-scaler 58(I) and the Q-channel data signal from the pre-scaler 58(Q) are each input to each of an I-channel upsampler 26(I)' and a Q-channel upsampler 26(Q)' respectively which function to increase the sampling rate from 4 MHz to 32 MHz, again by inserting sample values of zero at a 32 MHz rate between the 4 MHz sample values. The 32 MHz samples of each of the I-channel signal and the Q-channel signal are input to each of an I-channel pulse shaper 60(I) and a Q-channel pulse shaper 60(Q) (collectively referred to as pulse shapers 60). Pulse shapers 60 function similar to pulse shapers 28 as previously discussed with reference to FIG. 3. The coefficients for pulse shapers 60 are selected from coefficient matrixes 61(I) and 61 (Q). Each coefficient matrix 61 includes a single set of 16 coefficients, each coefficient being 10 bits wide. The I-channel output of pulse shaper 60(I) and the Q-channel output of pulse shaper 60(Q) have characteristics such that side band noise is reduced when the difference between the two signals is calculated to QAM modulate the data onto a carrier as is performed by adder 62.

It should be appreciated that the first embodiment of this invention requires 7 full multipliers utilizing approximately 500 gates each plus storage for a 7×16×10 and a 32×10 matrixes of coefficients requiring approximately 1440 gates. As such the total gate estimate for the first embodiment requires approximately 5,000 gates. The second embodiment of this invention requires 5 full multipliers (note that multipliers 58(I) and 58(Q) both operate on a 4 MHz data signal with is relatively slow compared to the 32 MHz data signal generated by the up samplers and as such both multipliers can be implemented in the same multiplier as if it were operating on an 8 MHz signal) requiring 500 gates each plus storage for a 2×16×10 and a 2×7×10 matrix of coefficients requiring 460 gates. As such the total gate estimate for the second embodiment requires approximately 3,000 gates.

It should be appreciated that the device and methods of this invention provide for I/Q modulation, frequency translation, and upsampling requiring significantly less complex DSP hardware than known systems. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. The device for modulating a carrier signal comprising:
   (a) a mapper generating a first data signal at a first data value frequency;
   (b) an upsampling device to increase a data value frequency of a first channel data signal to a second data value frequency;
   (c) a first pulse shaper including a finite impulse response filter operating on the first channel data signal to generate a filtered first channel data signal with characteristics that provide for reduced side band noise when mixed with a carrier frequency sine wave form signal;
   (d) a pre-scaler, positioned between the mapper and the upsampling device, operating to multiply the first channel data signal by a value corresponding to a selected baud rate to control signal strength of a carrier;
   (e) a second upsampling device to increase a data value frequency of a second channel data signal to a second data value frequency;
   (f) a second pulse shaper including a finite impulse response filter operating on the second channel data signal to generate a filtered second channel data signal with characteristics that provide for reduced side band noise when mixed with a carrier frequency cosine wave form signal; and
   (g) a second pre-scaler, positioned between the mapper and the second upsampling device, operating to multiply the second channel data signal by a value corresponding to the selected baud rate.

2. The device for modulating a carrier signal of claim 1, further including an adder for adding the result of the first pulse shaper and the second pulse shaper to generate a complex modulated carrier signal.

3. The device for modulating a carrier signal of claim 2, wherein the first channel data signal and the second channel data signal are an I-channel data signal and a Q-channel data signal respectively and the output of the adder is a quadrature amplitude modulated carrier signal.

4. A method of modulating a carrier signal, the method comprising:
   (a) generating a first channel data signal at a first data value frequency;
   (b) increasing the first data value frequency of the first channel data signal to a second data value frequency;
   (c) filtering the first channel data signal to generate a filtered first channel data signal with characteristics that, provide for reduced side band noise when mixed with a carrier frequency sine wave form signal;
   (d) scaling the first channel data signal with a value selected to correspond with a selected baud rate to control signal strength of a carrier;
   (e) generating a second channel data signal at the first data value frequency;
   (f) increasing the first data value frequency of the second channel data signal to the second data value frequency;
   (g) filtering the second channel data signal to generate a filtered second channel data signal with characteristics that provide for reduced side band noise when mixed with a carrier frequency cosine wave form signal; and
   (h) scaling the second channel data signal with a value selected to correspond with a selected baud rate to control signal strength of a carrier.

5. The method of modulating a carrier signal of claim 4, further including adding the filtered first channel data signal with the filtered second channel data signal to generate a complex modulated carrier signal.

6. The method of modulating a carrier signal of claim 5, wherein the first channel data signal and the second channel data signals are an I-channel data signal and Q-channel data signal respectively and the complex modulated carrier signal is a quadrature amplitude modulated carrier signal.

7. A device for modulating a carrier signal comprising:
   (a) a mapper generating a first channel data signal and a second channel data signal, both at a first data value frequency;
   (b) a complex mixer including:
      (i) a first multiplier and a second multiplier each multiplying the first channel data signal by a sine wave form and a cosine wave form respectively;
      (ii) a third and fourth multiplier each multiplying the second channel data signal by the sine waveform and a cosine wave form respectively;
      (iii) a first channel summer adding the result of the second multiplier to the result of the third multiplier multiplied by negative one; and
      (iv) a second channel summer adding the result of the first multiplier and the result of the fourth multiplier, the base rate sine waveform and the base rate cosine waveform having a frequency of one fourth a first sampling frequency;

(c) an upsampling device to increase the first data value frequency of a result of the first channel summer and a result of the second channel summer; and (d) a finite impulse response filter operating on the first channel data signal and the second channel data signal respectively to generate a filtered first channel data signal and a filtered second channel data signal, both with characteristics that provide for reduced side band noise when the filtered second channel data signal is subtracted from the filtered first channel data signal.

8. The device for modulating a carrier signal of claim 7, further including a third summer for subtracting the filtered second channel data signal from the filtered first channel data signal to generate a complex modulated carrier signal.

9. The device for modulating a carrier signal of claim 8, wherein the result of the first channel summer is an I-channel signal, the result of the second channel summer is a Q-channel signal, and an output of the third summer is a quadrature amplitude modulated carrier signal.

10. A method of modulating a carrier signal, the method comprising:

(a) generating a first channel data signal and a second channel data signal, both at a first data value frequency;

(b) performing complex mixing to generate:

(i) a first channel complex mixed signal resulting from subtracting a result of mixing the second channel data signal with a sine waveform from a result of mixing the first channel data signal with a cosine waveform; and (ii) a second channel complex mixed signal resulting from adding a result of mixing the second channel data signal with a cosine waveform and a result of mixing the first channel data signal with a sine waveform, the sine waveform and the cosine waveform having a frequency of one fourth the first data value frequency;

(c) upsampling each of the first channel complex mixed signal and the second channel complex mixed signal to increase the first data value frequency; and (d) filtering each of the first channel complex mixed signal and the second channel complex mixed signal to generate each of a first channel filtered complex mixed signal and a second channel filtered complex mixed signal respectively, both with characteristics that provide for reduced side band noise when the second channel filtered complex mixed signal is subtracted from the first channel filtered complex mixed signal.

11. The method of modulating a carrier signal of claim 10, further including subtracting the second channel filtered complex mixed signal from the first channel filtered complex mixed signal to generate a complex modulated carrier signal.

12. The method of modulating a carrier signal of claim 11, wherein the first channel data signal and the second channel data signal are an I-channel data signal and a Q-channel data signal respectively and the complex modulated carrier signal is a quadrature amplitude modulated carrier signal.

* * * * *

UNITED STATES PATENT AND TRADEMARK OFFICE
CERTIFICATE OF CORRECTION

PATENT NO.    : 6,535,073 B1                                              Page 1 of 1
DATED         : March 18, 2003
INVENTOR(S)   : Garg et al.

It is certified that error appears in the above-identified patent and that said Letters Patent is hereby corrected as shown below:

Column 4,
Line 26, replace "PRESENT INVENTION" with -- THE PRESENT INVENTION --

Column 5,
Line 12, replace "CLOCK 25 CYCLE" with -- CLOCK CYCLE --

Column 7,
Line 45, replace "THE DEVICE" with -- A DEVICE --

Signed and Sealed this

Twenty-fourth Day of June, 2003

JAMES E. ROGAN
*Director of the United States Patent and Trademark Office*